(12) United States Patent
Nomoto et al.

(10) Patent No.: US 11,704,612 B2
(45) Date of Patent: Jul. 18, 2023

(54) SUPPLY CHAIN MANAGEMENT SYSTEM, SUPPLY CHAIN MANAGEMENT METHOD, AND SUPPLY CHAIN MANAGEMENT APPARATUS

(71) Applicant: HITACHI, LTD., Tokyo (JP)

(72) Inventors: Tazu Nomoto, Tokyo (JP); Teppei Inoue, Tokyo (JP); Atsuki Kiuchi, Tokyo (JP)

(73) Assignee: HITACHI, LTD., Tokyo (JP)

( * ) Notice: Subject to any disclaimer, the term of this patent is extended or adjusted under 35 U.S.C. 154(b) by 0 days.

(21) Appl. No.: 17/363,192

(22) Filed: Jun. 30, 2021

(65) Prior Publication Data

US 2022/0012660 A1    Jan. 13, 2022

(30) Foreign Application Priority Data

Jul. 7, 2020    (JP) .................................. 2020-116960

(51) Int. Cl.
| | |
|---|---|
| *G06Q 10/00* | (2023.01) |
| *G06Q 10/0631* | (2023.01) |
| *G06Q 30/0201* | (2023.01) |
| *G06Q 10/0637* | (2023.01) |
| *G06Q 10/0639* | (2023.01) |
| *G06Q 10/04* | (2023.01) |

(52) U.S. Cl.
CPC .  *G06Q 10/06315* (2013.01); *G06Q 10/06375* (2013.01); *G06Q 10/06393* (2013.01); *G06Q 30/0201* (2013.01); *G06Q 30/0206* (2013.01); *G06Q 10/04* (2013.01)

(58) Field of Classification Search
None
See application file for complete search history.

(56) References Cited

U.S. PATENT DOCUMENTS 8,214,238 B1 *  7/2012  Fairfield ............ G06Q 30/0203
                                                705/7.29
10,102,488 B2  10/2018  Fischer et al.
(Continued)

OTHER PUBLICATIONS

Rathke, Sarah, Supply Chain Dispute Resolution in the US, 2015, Practical Law, https://www.globalsupplychainlawblog.com/wp-content/uploads/sites/22/2015/07/Supply-Chain-Dispute-Resolution-in-the-US.pdf, p. 1-6. (Year: 2015).*

*Primary Examiner* — Joseph M Waesco
(74) *Attorney, Agent, or Firm* — Mattingly & Malur, PC

(57) ABSTRACT

The supply chain management apparatus includes: an input unit that receives input information indicating a change in market conditions; a storage unit that stores supply chain information in which constituent companies of a supply chain, T&Cs information in which T&Cs of each of the constituent companies of the supply chain is registered, and a condition for a key performance indicator which should be satisfied, the condition for a key performance indicator being set for each of the constituent companies; a T&Cs calculation unit that, when the input information is received, calculates a supply chain plan corresponding to the change in the market conditions indicated by the input information based on a predetermined calculation method, and when a key performance indicator calculated based on the supply chain plan does not meet the condition for the key performance indicator, changes the T&Cs so that the key performance indicator is optimal.

5 Claims, 12 Drawing Sheets

(56) References Cited

U.S. PATENT DOCUMENTS

| | | | |
|---|---|---|---|
| 2001/0020230 A1* | 9/2001 | Kaneko | G06Q 10/06316 705/28 |
| 2006/0111921 A1* | 5/2006 | Chang | G06Q 10/06312 705/301 |
| 2007/0094063 A1* | 4/2007 | Skibinski | G06Q 10/06375 705/7.37 |
| 2008/0052149 A1* | 2/2008 | Fischer | G06Q 10/0637 705/7.31 |
| 2008/0071595 A1* | 3/2008 | Chang | G06Q 10/06316 705/7.22 |
| 2011/0251868 A1* | 10/2011 | Mikurak | G06Q 10/06315 705/7.25 |
| 2012/0166254 A1* | 6/2012 | Chang | G06Q 10/06315 705/7.36 |
| 2013/0211870 A1* | 8/2013 | Lawson | H04L 43/14 705/7.25 |
| 2014/0136273 A1* | 5/2014 | Bolene | G16H 40/20 705/7.25 |
| 2022/0277393 A1* | 9/2022 | Taylor | G06F 17/18 |

* cited by examiner

[FIG. 1]
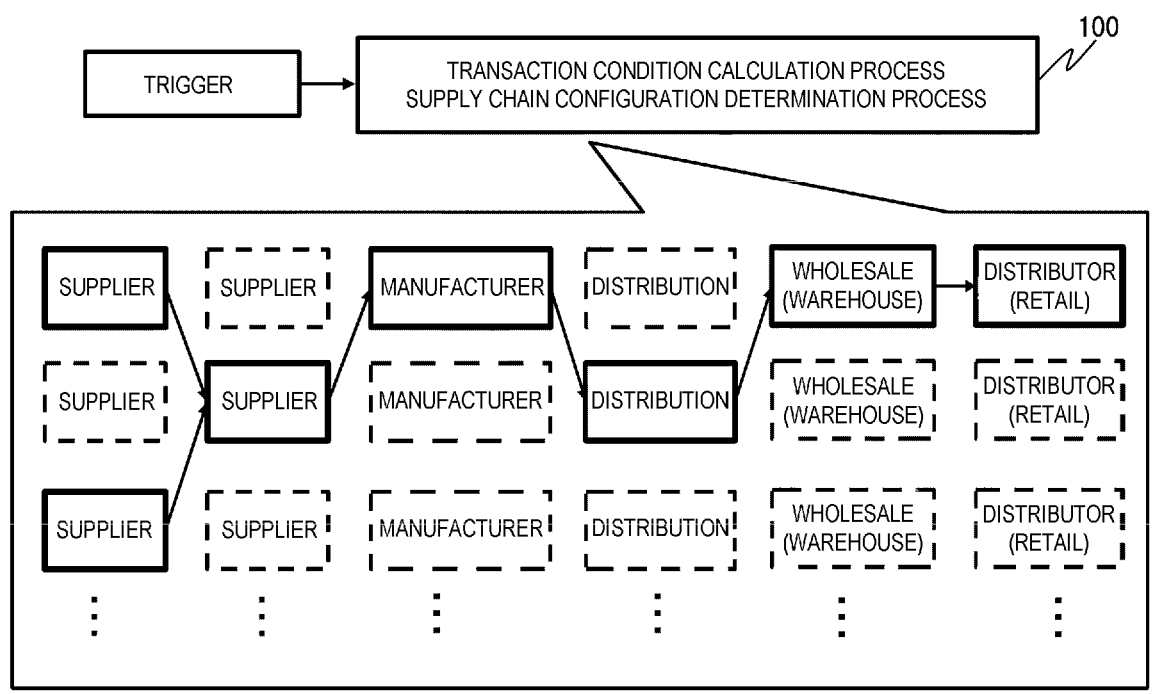

[FIG. 2]
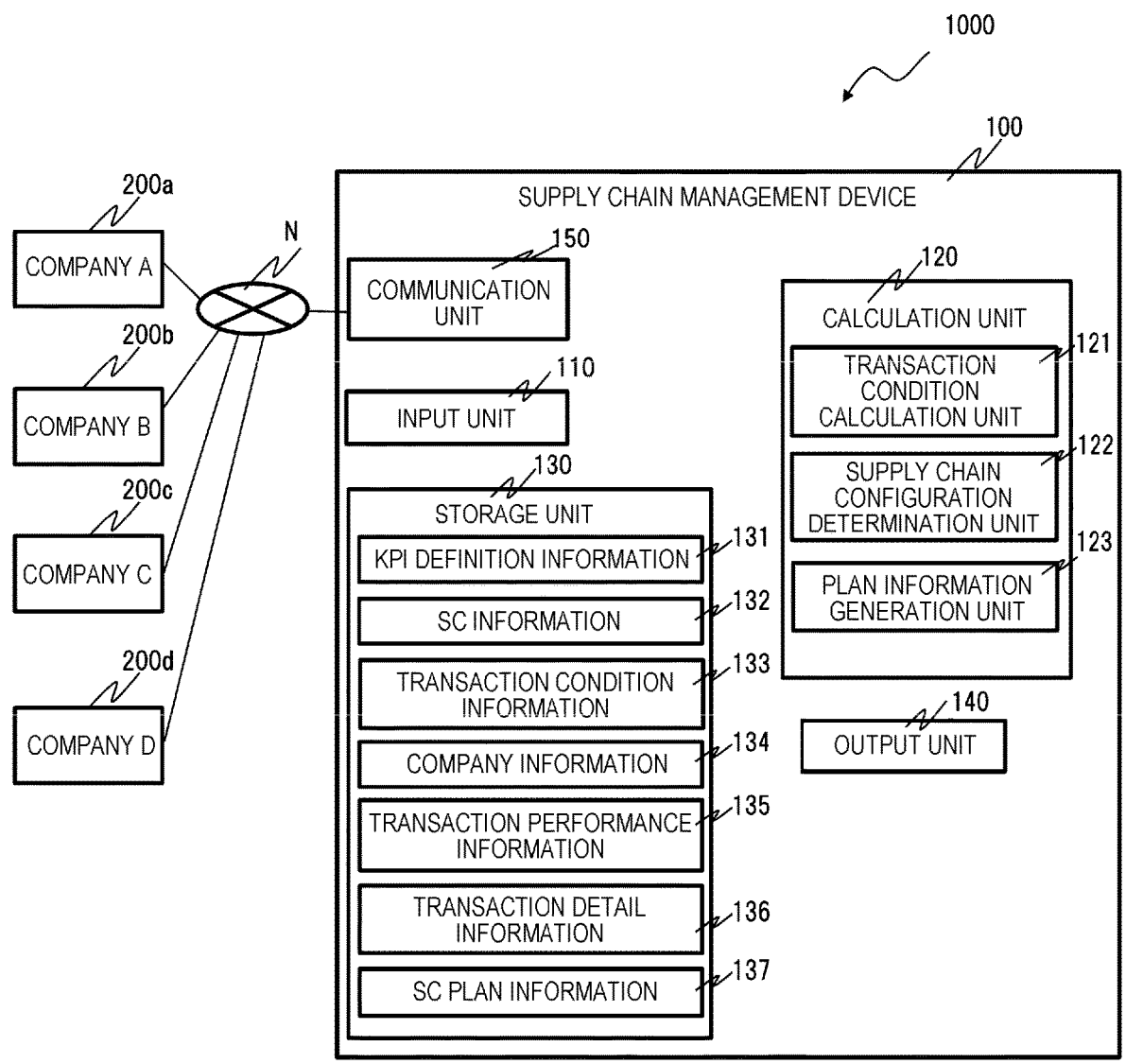

[FIG. 3]

SC INFORMATION 132

| ITEM | SALE | MANUFACTURE | TRANSPORTATION | WHOLESALE | VALUE |
|------|------|-------------|----------------|-----------|-------|
| PROD1 | S1 | P1 | D1 | W1 | 1000 |
| PROD3 | S2 | P2 | D2 | W2 | 500 |
| ... | ... | ... | ... | ... | ... |

Columns: 132a, 132b, 132c, 132d, 132e, 132f

[FIG. 4]

TRANSACTION CONDITION INFORMATION 133

| ITEM | PURCHASE | SUPPLY | MINIMUM LOT | LT | STANDARD PRICE | LIMITED EXPRESS ADDITION | ... |
|---|---|---|---|---|---|---|---|
| PROD1 | S1 | P1 | 10 | 3 | 1000 | 5% | |
| PROD3 | S2 | P2 | 10 | 3 | 500 | 5% | |
| PROD1 | S1 | P1 | 100 | 5 | 800 | 10% | |
| PARTS1 | P1 | V1 | 100 | 8 | 15 | N/A | |
| PARTS1 | P2 | V2 | 10 | 5 | 20 | N/A | |
| ... | ... | ... | ... | ... | ... | ... | |

COMPANY INFORMATION 134

| 134a | 134b | 134c | 134d | 134e | 134f |
|---|---|---|---|---|---|
| COMPANY | TYPE | ADDRESS | EVALUATION | ISO9000 ACQUISITION | BUSINESS PARTNER DESIGNATION |
| P1 | MANUFACTURE | xxx-xxxx ○ ROAD | 100 | 1995 | NO |
| O1 | DISTRIBUTION | xxx-xxxx ○ DISTRICT▲ ROAD XXX | 60 | - | YES |
| ... | ... | ... | ... | ... | |

[FIG. 6]

TRANSACTION PERFORMANCE INFORMATION 135

| MANAGEMENT NUMBER (135a) | REQUESTING COMPANY (135b) | REQUESTING COMPANY EVALUATION (135c) | RECEPTION COMPANY (135d) | RECEPTION COMPANY EVALUATION (135e) |
|---|---|---|---|---|
| 0001 | P1 | 100 | V1 | 100 |
| 0002 | O2 | 95 | S2 | 90 |
| ... | ... | ... | ... | ... |

[FIG. 7]

TRANSACTION DETAIL INFORMATION 136

| MANAGEMENT NUMBER | TRANSACTION CONTENT | ITEM | TRANSACTION DATE | TRANSACTION VOLUME | PLACE 1 | PLACE 2 |
|---|---|---|---|---|---|---|
| 0001 | MANUFACTURE | PROD1 | 2019/12/30 | 600 | P1 | - |
| 0002 | TRANSPORTATION | PROD3 | 2019/12/29 | 300 | O2 | S2 |
| ... | ... | ... | ... | ... | ... | ... |

Columns: 136a, 136b, 136c, 136d, 136e, 136f, 136g

[FIG. 8A]

SC PLAN INFORMATION 137A

| ITEM | PURCHASE | SUPPLY | QUANTITY | COST | KPI OF PURCHASE | DETERMINATION | KPI OF SUPPLY | DETERMINATION |
|------|----------|--------|----------|------|-----------------|---------------|---------------|---------------|
| PARTS1 | P2 | V2 | 30 | 600 | 500 OR LESS | × | 100 OR MORE | ○ |
| PARTS1 | P1 | V1 | 100 | 1500 | | | | |
| ... | ... | ... | ... | ... | ... | | ... | |

SC PLAN INFORMATION 137B

| ITEM | PURCHASE | SUPPLY | QUANTITY | COST | KPI OF PURCHASE | DETERMINATION | KPI OF SUPPLY | DETERMINATION |
|------|----------|--------|----------|------|-----------------|---------------|---------------|---------------|
| PARTS1 | P2 | V2 | 10 | 200 | 500 OR LESS | ○ | 100 OR MORE | ○ |
| PARTS1 | P1 | V1 | 100 | 1500 | | | | |
| PARTS1 | P2 | V1 | 20 | 300 | | | | |
| ... | ... | ... | ... | ... | ... | | ... | |

137a 137b 137c 137d 137e 137f 137g 137h 137i

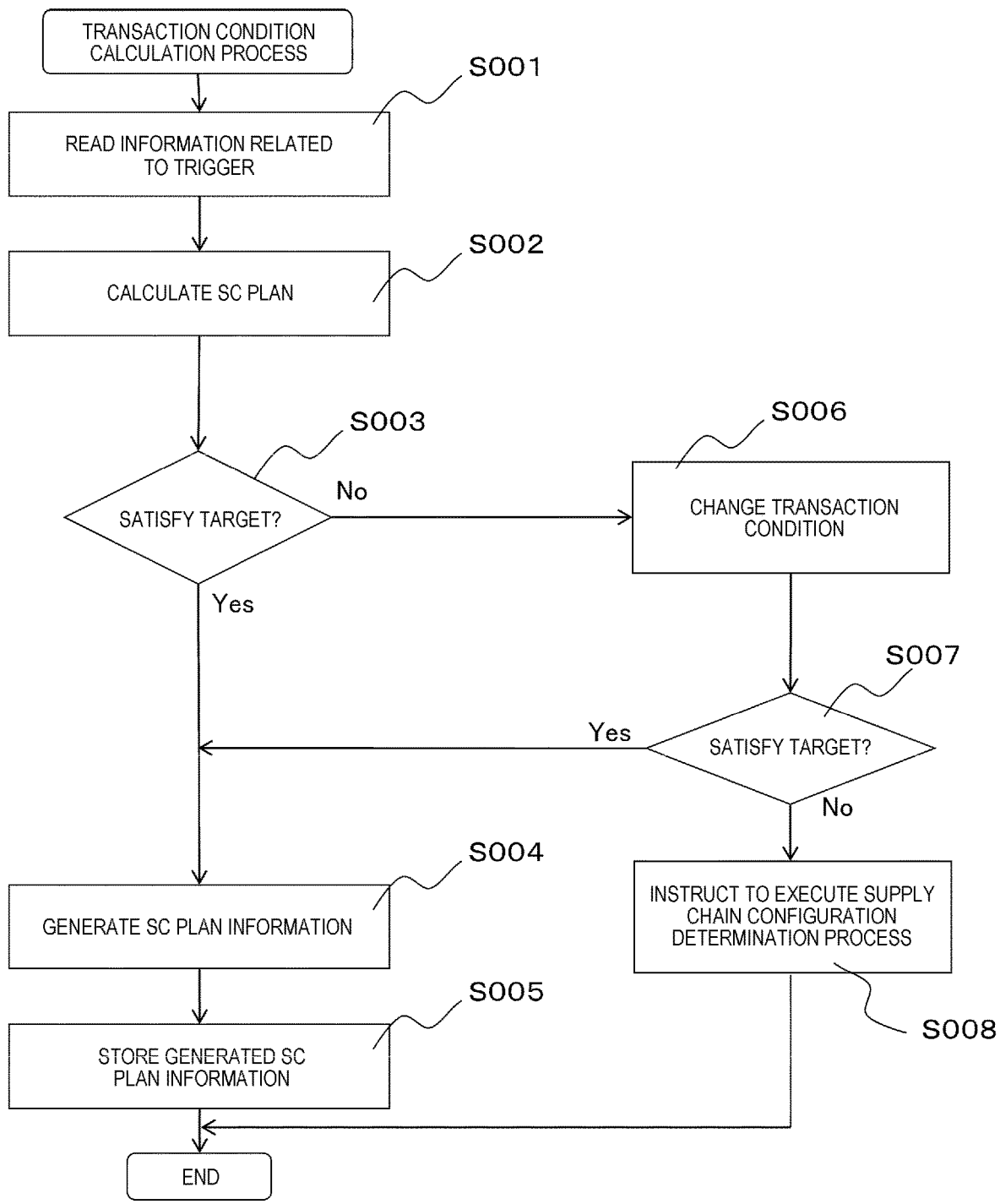

[FIG. 10]
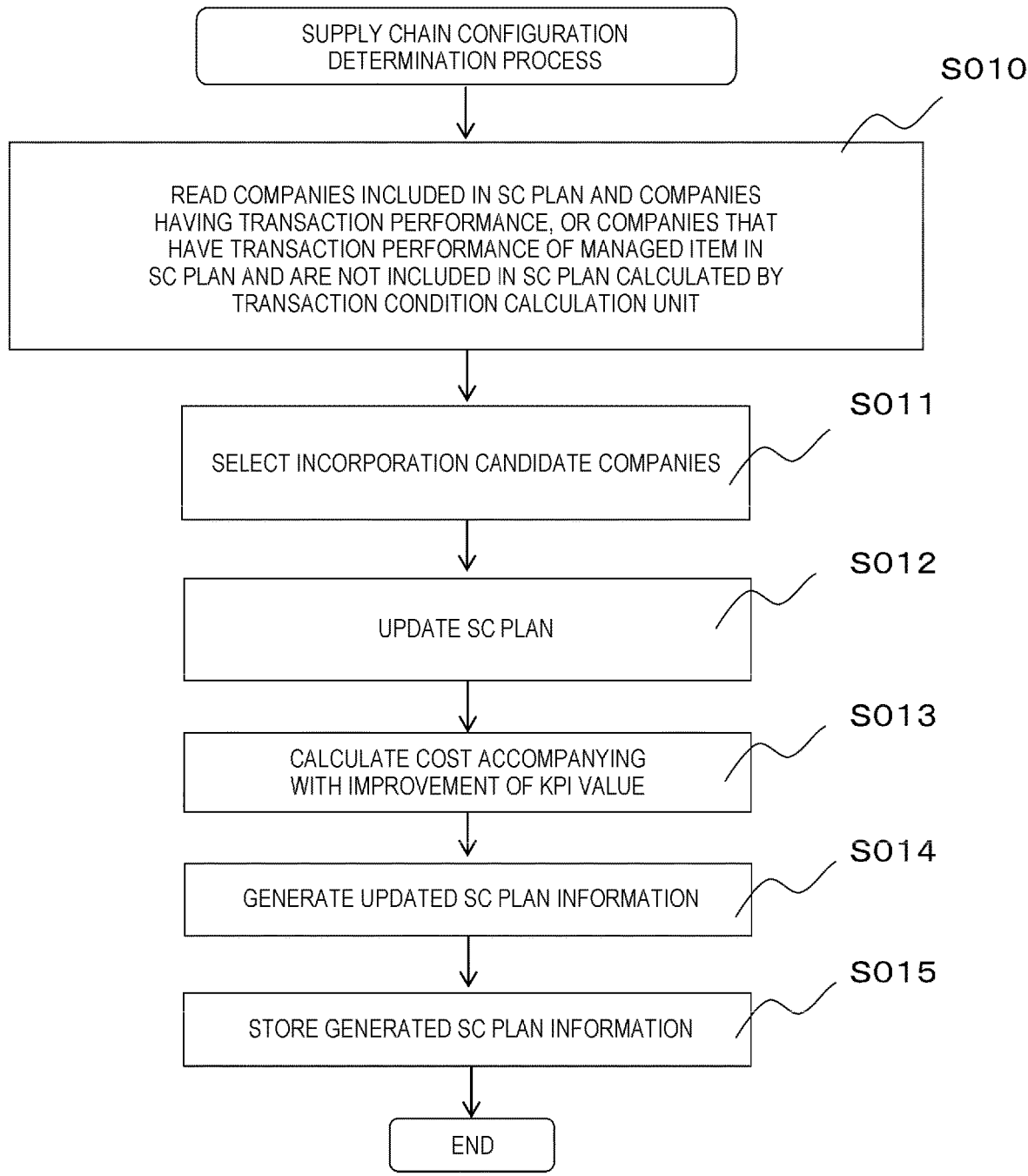

[FIG. 11]
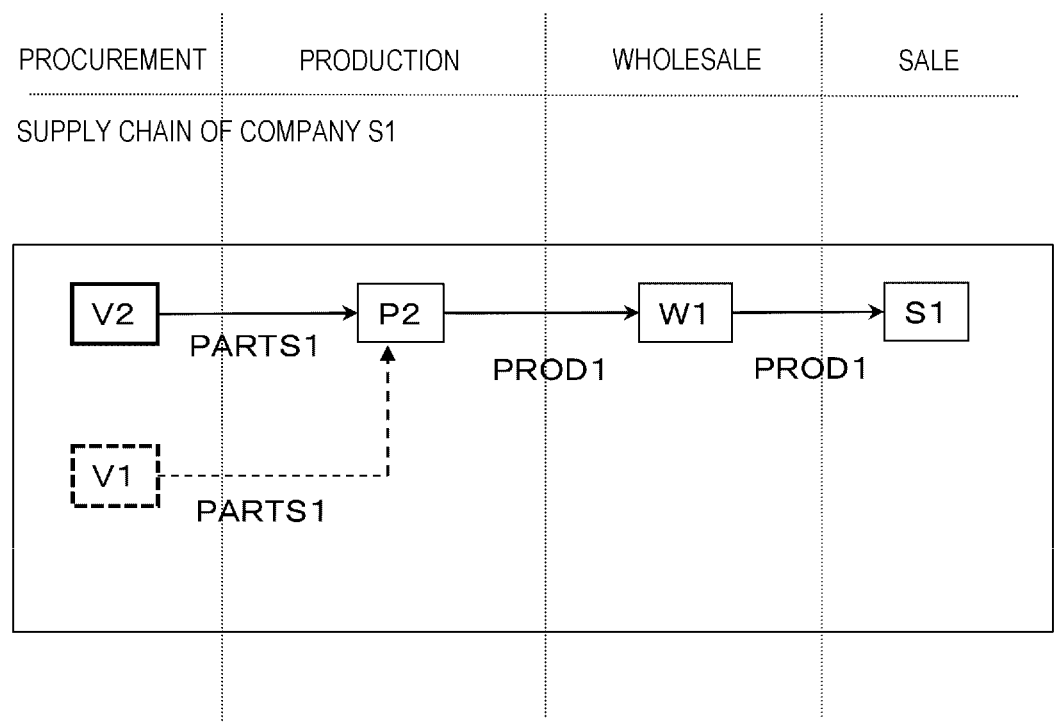

[FIG. 12]
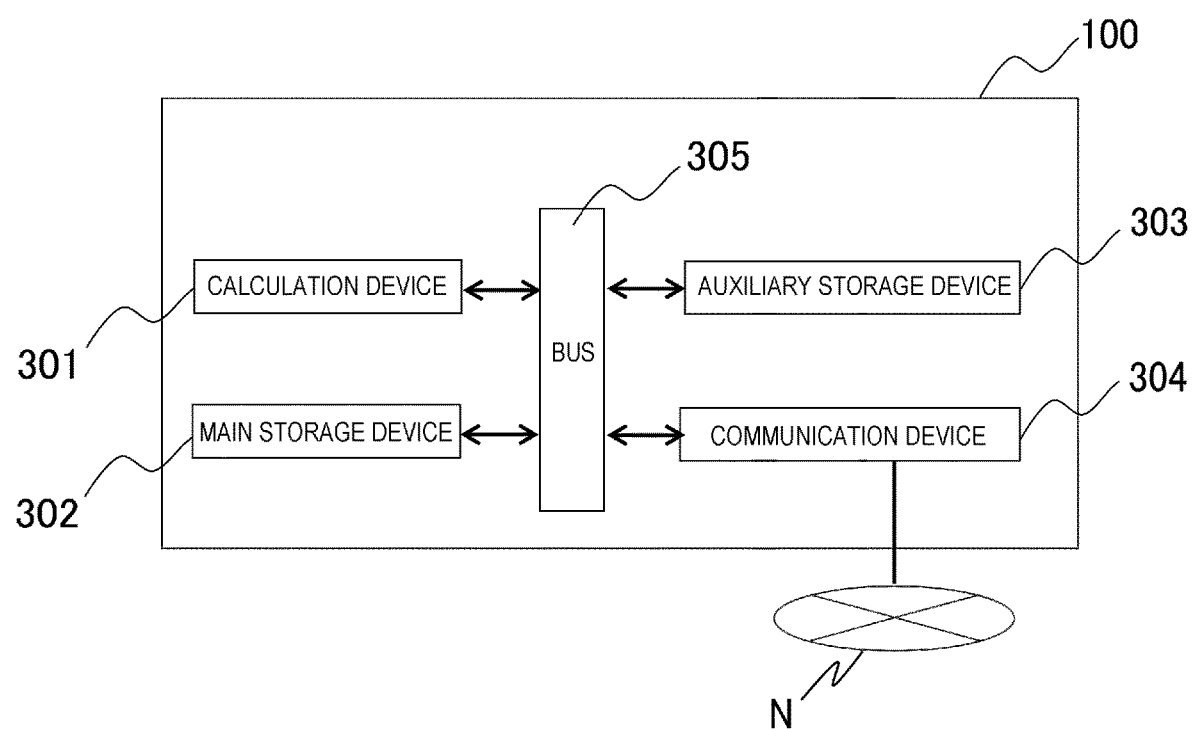

SUPPLY CHAIN MANAGEMENT SYSTEM, SUPPLY CHAIN MANAGEMENT METHOD, AND SUPPLY CHAIN MANAGEMENT APPARATUS

CROSS-REFERENCE TO RELATED APPLICATION

The present application claims priority from Japanese application JP 2020-116960, filed on Jul. 7, 2021, the contents of which is hereby incorporated by reference into this application.

TECHNICAL FIELD

The present invention relates to a supply chain management system, a supply chain management method, and a supply chain management apparatus.

BACKGROUND ART

PTL 1 relates to a supply chain management method and describes that "A system for managing a value chain includes a planning application that receives planning data from a number of entities included in a value chain and automatically generates a plan according to the planning data. At least two of the entities do not directly communicate planning data to one another. The system also includes a manager application that receives the plan and automatically identifies one or more exceptions in the plan, communicates planning data relating to the exceptions to one or more of the entities, receives instructions from one or more of the entities regarding how the exceptions are to be resolved, and automatically modifies the planning data in response to the instructions."

CITATION LIST

Patent Literature

PTL 1: U.S. patent Ser. No. 10/102,488

SUMMARY OF INVENTION

Technical Problem

Since a technique of PTL 1 is based on a supply chain configured in accordance with terms and conditions (T&Cs) by a specified company, changes in the supply chain (SC) due to a change in market conditions are limited to a range of the specified supply chain. Therefore, when the market conditions change significantly, the range in which the supply chain can be changed is limited, and demands of a market may not be met.

The invention has been made in view of the above problems and an object thereof is to provide a product in a timelier manner and at a lower cost by dynamically reorganizing a supply chain including constituent companies and each T&Cs in accordance with a change in market conditions.

Solution to Problem

The present application includes a plurality of methods for solving at least a part of the above problems, and an example thereof is as follows. A supply chain management system according to one aspect of the invention that solves the above problems includes a supply chain management apparatus and a company terminal that receives a service of providing information on the supply chain plan. The supply chain management apparatus includes: an input unit that receives input information indicating a change in market conditions; a storage unit that stores supply chain information in which constituent companies of a supply chain including at least two companies are registered, T&Cs information in which T&Cs of each of the constituent companies of the supply chain is registered, and a condition for a key performance indicator which should be satisfied, the condition for a key performance indicator being set for each of the constituent companies; T&Cs calculation unit that, when the input information is received, calculates a supply chain plan corresponding to the change in the market conditions indicated by the input information based on a predetermined calculation method, and when a key performance indicator calculated based on the supply chain plan does not meet the condition for the key performance indicator, changes the T&Cs so that the key performance indicator is optimal for the condition for the key performance indicator, and calculates the supply chain plan using the changed T&Cs; and an output unit that outputs the supply chain plan.

Advantageous Effect

According to the supply chain management system according to the invention, it is possible to provide a product immediately and at a lower cost by dynamically reorganizing the supply chain including the constituent companies and the T&Cs in accordance with the change in the market conditions.

BRIEF DESCRIPTION OF DRAWINGS

FIG. 1 is a diagram showing an outline of a supply chain.
FIG. 2 is a diagram showing an example of a schematic configuration of a supply chain management system.
FIG. 3 is a diagram showing an example of SC information.
FIG. 4 is a diagram showing an example of T&Cs information.
FIG. 5 is a diagram showing an example of company information.
FIG. 6 is a diagram showing an example of business record information.
FIG. 7 is a diagram showing an example of business record detail information.
FIGS. 8A and 8B are diagrams showing an example of SC plan information. FIG. 8A shows a first example of the SC plan information, and FIG. 8B shows a second example of the SC plan information.
FIG. 9 is a diagram showing an example of a T&Cs calculation process.
FIG. 10 is a diagram showing an example of a supply chain configuration determination process.
FIG. 11 is a diagram schematically showing an updated SC plan.
FIG. 12 is a diagram showing an example of a hardware configuration of a supply chain management apparatus.

DESCRIPTION OF EMBODIMENTS

Hereinafter, embodiments of the invention will be described with reference to the drawings.

First Embodiment

FIG. 1 is a diagram showing an outline of a supply chain according to the present embodiment. As shown in the figure, when a supply chain management system 1000 receives an input of information indicating a change in market conditions as a trigger, a supply chain management apparatus 100 executes T&Cs calculation process and a supply chain configuration determination process, and generates supply chain (SC) plan information for changing T&Cs of entities or companies (supplier: supplying company, manufacturer: manufacturing company, commodity distribution: transportation company, wholesale: warehouse and wholesale company, distributor: retail and sales company) constituting the supply chain and the constituent companies. The companies in the present embodiment do not necessarily have to be different capital and may be different departments in the same company.

FIG. 2 is a diagram showing an example of a schematic configuration of the supply chain management system 1000. As shown in the figure, the supply chain management system 1000 includes the supply chain management apparatus 100 and terminal devices 200a to 200d of companies that use a service provided by an SC plan calculated by the supply chain management apparatus 100. The supply chain management apparatus 100 and the terminal devices 200a to 200d of the companies are connected via a network N to be able to communicate with each other. The network N is, for example, a public network such as the Internet, a local area network (LAN), or a wide area network (WAN). The service provided by the SC plan will be described in a second embodiment described later.

The supply chain management apparatus 100 is a device that manages company activities from production to sales of products. Specifically, the supply chain management apparatus 100 includes an input unit 110, a calculation unit 120, a storage unit 130, an output unit 140, and a communication unit 150.

The input unit 110 is a functional unit that receives an input of the trigger via the communication unit 150. The trigger is information that indicates the change in the market conditions and is broadly divided into information, goods, and cash. For example, a change in the information includes receiving an order for a product, updating a demand forecast, changing a production plan, and various other changes related to the information. A change in the goods includes arrival of components, shipment of products, update of inventory, and various other changes related to the goods. A change in the cash includes generation of accounts receivable, execution of payments, deposit to accounts, and various other changes related to the cash.

The trigger received by the input unit 110 is specific information indicating such various changes, and is information that affects the SC plan calculated at a time point of receiving the input. For example, when the change in the market conditions is a change in the production plan, the trigger contains various information contained in a normal production plan, such as a target item or model numbers of components constituting the item, a supplier, a manufacturer, a manufacturing process, production time, and cost. The input unit 110 receives the specific information on such a trigger from an external device (for example, a management server that manages such information) via the communication unit 150. A specific data configuration such as the reception of an order for a product, the demand forecast, and the production plan may be a configuration content that is well known to a person skilled in the art, and detailed description thereof will be omitted.

The calculation unit 120 is a functional unit that performs various processes executed by the supply chain management apparatus 100. Specifically, the calculation unit 120 includes T&Cs calculation unit 121, a supply chain configuration determination unit 122, and a plan information generation unit 123.

The T&Cs calculation unit 121 is a functional unit that performs the T&Cs calculation process. Specifically, when receiving the input of the trigger, the T&Cs calculation unit 121 performs the T&Cs calculation process for reviewing the SC plan. Specifically, when information (trigger) indicating a change in the market such as a change in the production plan is input, the T&Cs calculation unit 121 calculates an SC plan in which a predetermined key performance indicator (KPI) value (hereinafter, may be referred to as "KPI value") set for each company is optimized using related information (for example, production plan information after the change) and predetermined information (SC information and T&Cs information described later) stored in the storage unit 130.

Here, the KPI is an indicator value that is provided by each company to evaluate the SC plan, and refers to, for example, sales, a profit, and a cost. A related KPI value, which should be satisfied for each company (for example, the KPI value of a manufacturer P2 is 500 or less), is set in advance, and is stored in the storage unit 130 as KPI definition information together with a KPI value calculation method. The KPI value may be calculated by different calculation methods on a company basis or a common calculation method for all companies.

The T&Cs calculation unit 121 executes the T&Cs calculation process, complies with a predetermined T&Cs registered in the T&Cs information, and calculates the SC plan corresponding to the change in the market conditions. When there are a plurality of calculated SC plans, the T&Cs calculation unit 121 specifies a condition of a KPI value that should be satisfied by the KPI value from the KPI definition information, and specifies and adopts an SC plan of an optimal KPI value for the condition. For example, when there is a condition that the KPI value should satisfy "500 or less", the T&Cs calculation unit 121 adopts an SC plan calculated by using T&Cs information having a small KPI value of 500 or less.

In addition, when the KPI value of each company in the calculated SC plan does not meet the condition of the KPI value which should be satisfied, the T&Cs calculation unit 121 changes the T&Cs within a predetermined range, and calculates a new SC plan based on the changed T&Cs information. When there are a plurality of change patterns of the T&Cs, the T&Cs calculation unit 121 adopts a change pattern having the optimal KPI value for a predetermined condition of the KPI value, and calculates the SC plan using the changed T&Cs.

As for a method for calculating the SC plan in consideration of the KPI, for example, well-known techniques described in JP-A-2001-233414 and JP-A-2018-063598 may be used, and the detailed description thereof will be omitted.

The supply chain configuration determination unit 122 is a functional unit that performs a supply chain configuration determination process. Specifically, when the optimal KPI value of each company included in the SC plan calculated by the T&Cs calculation process does not meet the condition of the KPI value that should be satisfied, the supply chain configuration determination unit 122 executes the supply chain configuration determination process. More specifically, the supply chain configuration determination unit 122 changes (reorganizes) the constituent companies of the supply chain in managed items by using the predetermined information (in addition to the SC information and the T&Cs information, company information, business record information, business record detail information described later) stored in the storage unit 130, and calculates an SC plan that meets the condition of the KPI value of each company and responds to the change in the market.

When there are a plurality of change patterns of the constituent companies that meet the predetermined condition of the KPI value, the supply chain configuration determination unit 122 adopts a change pattern having an optimal KPI value for the related condition, and calculates the SC plan based on the changed supply chain constituent companies.

The plan information generation unit 123 is a functional unit that generates the SC plan information based on the calculated SC plan.

The storage unit 130 is a functional unit that stores KPI information. Specifically, the storage unit 130 stores KPI definition information 131, SC information 132, T&Cs information 133, company information 134, business record information 135, business record detail information 136, and SC plan information 137.

The KPI definition information 131 is information in which the predetermined condition that should be satisfied by the KPI value that is the key performance indicator of each company is defined. Further, the KPI definition information 131 also defines a method for calculating the KPI value for each company.

FIG. 3 is a diagram showing an example of the SC information 132. The SC information 132 is information in which values of the constituent companies of the supply chain including at least two companies and the managed items are registered. Specifically, the SC information 132 includes a record in which an item 132a, a sale 132b, a manufacture 132c, a transportation 132d, a wholesale 132e, and a value 132f are associated with each other.

The item 132a is information indicating each of the managed items. The sale 132b, the manufacture 132c, the transportation 132d, and the wholesale 132e are information indicating companies (entity, trader) responsible for respective businesses. The value 132f is information indicating a standard selling price, a shipping price, or the like of the managed item. For example, a top record of the SC information 132 shown in the figure shows that, an item "PROD1" manufactured by a company "P1" is sold by a company "S1", a transporter and a wholesale of the item are carried out by companies "D1" and "W1", respectively, and the selling price of the item is "1000".

In addition to the above information, the SC information 132 includes predetermined information (not shown) such as component composition information, production process information, and working hours necessary for producing and distributing the managed item.

FIG. 4 is a diagram showing an example of the T&Cs information 133. The T&Cs information 133 is information in which a T&Cs of a target managed item between companies is registered. Specifically, the T&Cs information 133 includes a record in which an item 133a, a purchase 133b, a supply 133c, a minimum lot 133d, and LT 133e, a standard price 133f, a limited express addition 133g, and other predetermined item 133h (not shown) are associated with each other.

The item 133a is information indicating each of the managed items. The purchase 133b is information indicating a company that purchases the managed item from a supplying company. The supply 133c is information indicating a company that supplies the managed item to a purchasing company. The minimum lot 133d is information indicating the number of lots of a minimum unit in a business of the managed item. The LT 133e is information indicating a lead time in the business of the managed item. The standard price 133f is information indicating a standard price of the managed item. The limited express addition 133g is information indicating a charge to be added when the managed item is delivered in a shorter period than a registered LT. For example, a top record of the T&Cs information 133 shown in the figure shows that the managed item "PROD1" is traded between a purchasing company "S1" and a supplying company "P1" based on a minimum unit of "10" in a lead time of "3" and at a standard price of "1000", and the limited express addition per unit is "5"% of the standard price when shortening the lead time.

FIG. 5 is a diagram showing an example of the company information 134. The company information 134 is information in which an attribute, an evaluation, and the like of a company managed by the supply chain management apparatus 100 are registered. Specifically, the company information 134 includes a record in which a company 134a, a type 134b, an address 134c, an evaluation 134d, an ISO9000 acquisition 134e, and a business partner designation 134f are associated with each other.

The company 134a is information that identifies a company, for example, information that indicates a name of the company. The type 134b is information indicating a type of industry, and includes, for example, manufacture, sales, distribution, and wholesale. The address 134c is information indicating an address of the company. The evaluation 134d is information indicating an evaluation value of the company, in which the value obtained by evaluating each company by a predetermined calculation formula is registered. The ISO9000 acquisition 134e is information indicating a year in which one of ISO9000 series, which is a standard related to a quality of the International Organization for Standardization (ISO), was acquired. The business partner designation 134f is information indicating whether the company can be changed as a company of a corresponding type registered in the T&Cs information 133 with "Yes" and "No". For example, when "Yes" is registered in the business partner designation, it indicates that the company cannot be changed when the constituent companies of the supply chain are recombined, and when "No" is registered, it indicates that the company can be changed when recombining the companies constituting the supply chain.

FIG. 6 is a diagram showing an example of the business record information 135. The business record information 135 is information in which a business record between companies and evaluation values of the companies are registered. Specifically, the business record information 135 includes a record in which a management number 135a, a requesting company 135b, a requesting company evaluation 135c, a reception company 135d, and a reception company evaluation 135e are associated with each other.

The management number 135a is information for identifying the business record between associated companies. The requesting company 135b is information indicating the requesting company in the supply, manufacture, transportation, wholesale and sales. The requesting company evaluation 135c is information indicating an evaluation value obtained by evaluating the requesting company by a predetermined method regarding to the business record between corresponding companies. The reception company 135d is information indicating a company that has accepted a request from the requesting company. The reception company evaluation 135e is information indicating an evaluation value obtained by evaluating the reception company by a predetermined method regarding to the business record between corresponding companies.

FIG. 7 is a diagram showing an example of the business record detail information 136. The business record detail information 136 is information in which details about a business are registered. Specifically, the business record detail information 136 includes a record in which a management number 136a, a business content 136b, an item 136c, a business date 136d, a business volume 136e, a place 1 (136f), and a place (136g) are associated with each other.

The management number 136a is information for identifying a business and is common to the management number of the business record information 135. The business content 136b is information indicating a content of the business and includes, for example, manufacture and transportation. The item 136c is information indicating the managed item. The business date 136d is information indicating a date of the transaction. The business volume 136e is information indicating a quantity of the managed item that is transacted. The place 1 (136f) and the place 2 (136g) are information indicating a start point and an end point of the transaction, respectively. For example, atop record of the business record detail information 136 shown in the figure shows that the managed item "PROD1" was manufactured in "600" units at a place "P1" on "2019/12/30". In addition, a following record shows that a managed item "PROD3" was transported from a place "O2" to "S2" in "300" units on "2019/12/29".

The KPI definition information 131, the SC information 132, the T&Cs information 133, the company information 134, the business record information 135, and the business record detail information 136 are used for the T&Cs calculation process and the supply chain configuration determination process.

FIGS. 8A and 8B are diagrams showing an example of the SC plan information 137. FIG. 8A shows an example of an SC plan information 137A, and FIG. 8B shows an example of an SC plan information 137B. The SC plan information 137A and 137B are information in which a flow rate of the goods and the cash (a flow and a cost of the managed item) and information on KPIs of the constituent companies in a plan are registered. Specifically, the SC plan information includes a record in which, taking the SC plan information 137A as an example, an item 137a, a purchase 137b, a supply 137c, a quantity 137d, a cost 137e, and a KPI of purchase 137f, a determination 137g, a KPI of supply 137h, a determination 137i are associated with each other.

The item 137a is information indicating the managed item. The purchase 137b is information indicating a purchasing company. The supply 137c is information indicating a supplying company. The quantity 137d is information indicating a quantity of the transaction. The cost 137e is information indicating a cost per unit quantity of the managed item. The KPI of purchase 137f is information indicating a KPI value which should be satisfied by the purchasing company. A record 137j in FIG. 8A shows that a KPI value which should be satisfied by a purchasing company "P2" is 500 or less. The determination 137g is information indicating a determination result of whether a calculated KPI value of the purchasing company meets a condition of the KPI value which should be satisfied by the company.

The KPI of supply 137h is information indicating a KPI value which should be satisfied by the supplying company. The record 137j in FIG. 8A shows that the KPI value which should be satisfied by a supplying company "V2" is 100 or more. The determination 137i is information indicating a determination result of whether a KPI value of the supplying company satisfies a condition of a KPI value which should be satisfied by the company.

The SC plan information 137 is generated by the plan information generation unit 123 based on the SC plan calculated by executing the T&Cs calculation process or the supply chain configuration determination process.

The description will refer back to FIG. 2. The output unit 140 is a functional unit that outputs predetermined information (for example, the SC plan information 137B) to an external device (for example, a terminal device of each company) via the communication unit 150. In addition, the output unit 140 calculates a cost associated with an improvement of the KPI value.

The communication unit 150 is a functional unit that performs information communication with the external device. Specifically, the communication unit 150 acquires information indicating a change in the market conditions that triggers the T&Cs calculation process and the supply chain configuration determination process from the external device (for example, a server device). In addition, the communication unit 150 transmits the SC plan information 137B generated by the supply chain management apparatus 100 to the terminal devices 200a to 200d of the companies.

A functional configuration of the supply chain management apparatus 100 has been described above.

[Description of Operation]

Next, the T&Cs calculation process executed by the supply chain management apparatus 100 will be described.

FIG. 9 is a diagram showing an example of the T&Cs calculation process. Related processes are started when the input unit 110 receives an input of trigger information from the external device via the communication unit 150.

When the process is started, the T&Cs calculation unit 121 acquires the SC information 132 and the T&Cs information 133 from the storage unit 130, and reads information (record) related to the trigger from this information (step S001). Specifically, the T&Cs calculation unit 121 specifies a related managed item and target companies constituting the supply chain in the item from information input as a trigger (for example, a changed production plan information), and extracts and reads a record including the managed item and the target companies from the SC information 132 and the T&Cs information 133.

Next, the T&Cs calculation unit 121 calculates the SC plan (step S002). Specifically, the T&Cs calculation unit 121 calculates the SC plan by using a predetermined method (known technique) using the read SC information 132 and the T&Cs information 133. More specifically, the T&Cs calculation unit 121 calculates an SC plan that matches the information content input as the trigger within a range of T&Cs registered in the T&Cs information 133. That is, as an example, when the input information is the changed production plan information, the SC plan is calculated to match the production quantity, the manufacturing date, the delivery date, the cost, and the like indicated by the changed production plan by using the changed production plan information, the read SC information 132, and the T&Cs information 133.

In addition, the T&Cs calculation unit 121 calculates KPI values of the target companies included in the SC plan. Specifically, the T&Cs calculation unit 121 calculates the KPI value for each target company by a predetermined calculation formula using the calculated quantity and cost of the managed item between the target companies.

When there are a plurality of calculated SC plans, the T&Cs calculation unit 121 specifies the condition of the KPI value which should be satisfied by the KPI value from the KPI definition information 131, and specifies and adopts the SC plan of an optimal KPI value based on this condition.

Next, the T&Cs calculation unit 121 determines whether the KPI values of the target companies included in the adopted SC plan satisfy a target, that is, whether the condition of the KPI value which should be satisfied and is defined by the KPI definition information 131 is met (step S003). When it is determined that the condition is satisfied (Yes in step S003), the plan information generation unit 123 generates the SC plan information 137 based on the adopted SC plan (step S004) and stores the information in the storage unit 130 (step S005). In addition, the plan information generation unit 123 ends the process flow after executing the related processes.

On the other hand, when it is determined that the predetermined condition is not met (No in step S003), the T&Cs calculation unit 121 changes the T&Cs read in step S001 within a predetermined range (step S006). The changeable T&Cs is defined by the T&Cs information 133. For example, in the T&Cs information 133 in FIG. 4, it is shown that the item of the "limited express addition" can change the lead time. It is assumed that a change width of the changeable item is also registered in the T&Cs information 133 in advance (not shown). For example, in the T&Cs information 133 of FIG. 4, the change range of the lead time is registered in advance as 1 or less. In this case, the lead time can be shortened from "3" to "2" instead of the limited express addition.

In this way, the T&Cs calculation unit 121 changes the T&Cs within a predetermined change range for the changeable item of the T&Cs information 133, and recalculates the SC plan using the changed T&Cs.

In addition, the T&Cs calculation unit 121 recalculates the KPI values of the target companies in the changed SC plan using the changed T&Cs. Also, in this case, when there are a plurality of calculated SC plans, the T&Cs calculation unit 121 specifies the condition of the KPI value that should be satisfied by the KPI value from the KPI definition information 131, and specifies and adopts the SC plan of the optimal KPI value.

Next, the T&Cs calculation unit 121 determines whether the KPI values of the target companies included in the adopted SC plan satisfy the target (step S007). When it is determined that the target is satisfied (Yes in step S007), the T&Cs calculation unit 121 shifts the process to the above-mentioned step S004.

On the other hand, when it is determined that the predetermined condition is not satisfied even if the T&Cs information 133 is changed (No in step S007), the T&Cs calculation unit 121 instructs the supply chain configuration determination unit 122 to execute the supply chain configuration determination process (step S008) and ends this flow.

Next, the supply chain configuration determination process will be described.

FIG. 10 is a diagram showing an example of the supply chain configuration determination process. The supply chain configuration determination unit 122 starts the process based on the instruction from the T&Cs calculation unit 121.

When the process is started, the supply chain configuration determination unit 122 extracts and reads companies included in the SC plan calculated by the T&Cs calculation unit 121 or companies that have a business record of the managed item in the SC plan and are not included in the SC plan by using the company information 134, the business record information 135, and the business record detail information 136 (step S010).

For example, the supply chain configuration determination unit 122 uses the business record information 135 to specify the target companies included in the SC plan and the companies having the business record. In addition, the supply chain configuration determination unit 122 specifies the companies having the business record of the managed item of the SC plan by using, for example, the business record detail information 136. In addition, the supply chain configuration determination unit 122 specifies the companies that are not included in the SC plan from the specified companies, and extracts and reads these companies.

Next, the supply chain configuration determination unit 122 specifies candidate companies to be incorporated in the supply chain (step S011). Specifically, the supply chain configuration determination unit 122 considers companies that do not meet the condition of the KPI value that should be satisfied in the SC plan as bottlenecks, and selects companies having a business record with the related companies, or companies having a business record of the managed item (item transacted between the related companies and the transactional partners) targeted by the related companies (companies as bottlenecks) in the SC plan, from the companies read in step S010.

When specifying the related companies, the supply chain configuration determination unit 122 refers to the values of company evaluation (requesting or reception company evaluation) registered in t business record, the evaluation or qualifications of the ISO9000 series registered in the company information 134, and may further narrow down the companies based on these evaluation values and the presence or absence of qualifications.

Next, the supply chain configuration determination unit 122 updates the SC plan (step S012). Specifically, the supply chain configuration determination unit 122 incorporates the selected incorporation candidate companies into the constituent companies of the supply chain, and calculates (updates) the SC plan in which the KPI value of each constituent company is optimal based on T&Cs of a new constituent company in the supply chain by the same method as the T&Cs calculation process.

FIG. 8B shows an example of the SC plan information 137B updated by the supply chain configuration determination process. In the SC plan shown in FIG. 8A, that is, the SC plan calculated by the T&Cs calculation process, the KPI value of the purchasing company P2 did not meet the condition of the KPI value that should be satisfied. On the other hand, as shown in FIG. 8B, in the supply chain configuration determination process, an SC plan is calculated in which a supply source company of P2 is changed from V2 only to V2 and V1, so that in the SC plan information 137B, the KPI value of the P2 meets the condition (500 or less) of the KPI value which should be satisfied.

FIG. 11 is a diagram schematically showing an updated SC plan. As shown in the figure, in an original SC plan, P2, a production (purchasing) company, acquires PARTS1 from only V2, a procurement (supplying) company; by being changed to acquire PARTS1 from two companies, V2 and V1, the SC plan is calculated in which the KPI value of the P2 satisfies the target value.

The supply chain configuration determination unit 122 refers to the company information 134 of other companies (for example, in FIGS. 8A and 8B, the supplying company V2) that deal with the companies (for example, in FIGS. 8A and 8B, the purchasing company P2) that are the bottlenecks in the SC plan, and may exclude related companies from the supply chain and replace the companies with another company that handles the same managed item to calculate the SC plan when "No" is registered in the business partner designation.

Next, the output unit 140 calculates the cost accompanying with the improvement of the KPI value (step S013). Specifically, the output unit 140 calculates a degree of improvement of the KPI value by the supply chain configuration determination process for each target company of the SC plan. More specifically, the output unit 140 calculates a cost reflecting the degree of the improvement by a predetermined calculation formula according to the KPI (for example, sales, a profit, a cost, a shipping cost, and lead time) of each company.

For example, in a target company in which a transportation cost is set as a key performance indicator, the degree of improvement in the KPI value may be calculated as the cost, and in a target company in which lead time is set as a key performance indicator, the cost may be calculated by adding a predetermined cost coefficient to the degree of improvement of the KPI value.

Also, in the T&Cs calculation process, when the KPI value of each company included in the SC plan meets the condition of the KPI value that should be satisfied by changing the T&Cs of the target company, the cost accompanying with the improvement of the KPI value may be calculated by the same method as in the case of the supply chain configuration determination process.

Then, the plan information generation unit 123 generates the SC plan information 137 based on the updated SC plan (step S014), and stores the information in the storage unit 130 (step S015). In addition, the plan information generation unit 123 ends this process flow after executing the related processes.

The output unit 140 transmits the generated or updated SC plan information 137B to the constituent companies of the supply chain via the communication unit 150.

The T&Cs calculation process and the supply chain configuration determination process have been described above.

According to such a supply chain management system 1000, by dynamically reorganizing the supply chain including the constituent companies and the T&Cs in accordance with the change in the market conditions, products can be provided in a timelier manner and at a low cost.

Second Embodiment

Next, the second embodiment will be described. The supply chain management system 1000 according to the present embodiment provides a metered rate supply chain operation service by using the supply chain management apparatus 100. Specifically, the output unit 140 of the supply chain management apparatus 100 provides the generated SC plan information 137 to constituent companies of a supply chain via the communication unit 150. Further, the output unit 140 calculates a service fee for providing information based on the cost calculated in step S013 described above. More specifically, the output unit 140 adds a reward fee obtained by adding a predetermined coefficient to the cost calculated in the process of step S013 to a basic fee for using the service and charges each company for a total fee as an operation service fee.

For companies whose KPI values in an SC plan calculated by T&Cs calculation process and a supply chain configuration determination process are worse than KPI values in the SC plan before these processes, a fee corresponding to a cost of deterioration is calculated and is discounted from the basic fee as a cooperation fee.

According to such a supply chain management apparatus 100, the reward fee can be obtained as the KPI value is improved. In addition, even if the reward fee is added, the company can expect a profit due to the improvement of the KPI value, which is beneficial to both a service providing company and a service receiving company.

An example of a hardware configuration of the supply chain management apparatus 100 will be described below.

FIG. 12 is a diagram showing an example of the hardware configuration of the supply chain management apparatus 100. The supply chain management apparatus 100 is implemented by a high-performance information processing device such as a server device.

As shown in the figure, the supply chain management apparatus 100 includes a calculation device 301, a main storage device 302, an auxiliary storage device 303, a communication device 304, and a bus 305 that electrically interconnects them.

The calculation device 301 is, for example, a central processing unit (CPU). The main storage device 302 is a memory device such as a random access memory (RAM) or a read only memory (ROM).

The auxiliary storage device 303 is a non-volatile storage device such as a so-called hard disk (Hard Disk Drive), a solid state drive (SSD), or a flash memory that can store digital information.

The communication device 304 is a wired communication device 304 that performs wired communication via a network cable, or a wireless communication device 304 that performs wireless communication via an antenna. The communication device 304 performs information communication with an external device connected to a network N.

The example of the hardware configuration of the supply chain management apparatus 100 has been described above.

The input unit 110, the output unit 140, and the calculation unit 120 of the supply chain management apparatus 100 are implemented by a program that causes the calculation device 301 to perform processing. This program is stored in the main storage device 302 or the auxiliary storage device 303, is loaded on the main storage device 302 when the program is executed, and is executed by the calculation device 301. Further, the storage unit 130 is implemented by the main storage device 302, the auxiliary storage device 303, or a combination thereof. Further, the communication unit 150 is implemented by the communication device 304.

In addition, each of the above-mentioned configurations, functions, processing units, processing methods, and the like of the supply chain management apparatus 100 may be implemented by hardware by designing a part or all of them by, for example, an integrated circuit. Further, the above configurations and functions may be implemented by software by a processor that interprets and executes a program that implements the functions. Information such as programs, tables, and files that implement the functions can be stored in a storage device such as a memory, a hard disk, or an SSD, or a recording medium such as an IC card, an SD card, or a DVD.

Further, the invention is not limited to the above-described embodiments, and includes various modifications. For example, the above-described embodiments have been described in detail in order to explain the invention in an easy-to-understand manner, and are not necessarily limited to those having all the described configurations. Further, a part of the configuration of one embodiment can be replaced with the configuration of another embodiment, and the configuration of the other embodiment can be added to the configuration of the one embodiment. Further, a part of the configuration of the embodiments may be added to, deleted from, or replaced with another configuration.

In addition, in the above description, control lines and information lines indicate what is considered necessary for description, and do not necessarily indicate all the control lines and information lines in a product. In practice, it may be considered that almost all configurations are connected to each other.

REFERENCE SIGN LIST 1000 supply chain management system
100 supply chain management apparatus
110 input unit
120 calculation unit
121 T&Cs calculation unit
122 supply chain configuration determination unit
123 plan information generation unit
130 storage unit
131 KPI definition information
132 SC information
133 T&Cs information
134 company information
135 business record information
136 business record detail information
137 SC plan information
140 output unit
150 communication unit
N network
200a to 200d companies A to D
301 calculation device
302 main storage device
303 auxiliary storage device
304 communication device
305 bus

The invention claimed is:

1. A supply chain management system including a supply chain management apparatus,
the supply chain management apparatus comprising:
at least one storage device having a program stored thereon;
a processor which when executing the program configures the processor to:
receive input information, from an external server device, indicating a change in market conditions as a trigger,
store, in the at least one storage device, supply chain information in which constituent companies of a supply chain including at least two companies are registered, terms and conditions (T&Cs) information in which a T&Cs of each of the constituent companies of the supply chain is registered, and a condition for a key performance indicator which should be satisfied, the condition for the key performance indicator being set for each of the constituent companies,
when the input information is received, calculate a supply chain plan corresponding to the change in the supply chain plan corresponding to the change in the market conditions indicated by the input information based on a predetermined T&C calculation process, and when a key performance indicator calculated based on the supply chain plan does not meet the condition for the key performance indicator, dynamically change at least one of the T&Cs that is related to lead time and that is permitted to be changed within a predetermined range of lead time previously set for the at least one of the T&Cs so that the key performance indicator is optimal for the condition for the key performance indicator, and calculate the supply chain plan using the changed T&Cs,
when the key performance indicator of one of the constituent companies that is calculated by the processor does not meet the condition for the key performance indicator which should be satisfied, execute a supply chain determination process to specify candidate companies by excluding companies that cannot satisfy the key performance indicator as bottlenecks and dynamically change a transactional partner of the one constituent company to one of the candidate companies that do satisfy the key performance indicator, and updates the supply chain plan using the T&Cs of the changed constituent company, wherein and
output the supply chain plan and the updated supply chain plan to the at least two companies via a communication unit; and
a company terminal device of each of the at least two companies that receives an information provision service of the supply chain plan and the updated supply chain plan,
wherein the processor is further configured to:
output the calculated supply chain plan to a company that receives information on the supply chain plan,
calculate a cost based on a degree of improvement of the key performance indicator improved by a process performed by the calculating or the dynamically changing by the processor; and
calculate, using the cost, a reward fee to be charged to the company.

2. The supply chain management system according to claim 1, wherein
the processor is further configured to select a new transactional partner from companies having a business record with the constituent company that does not meet the condition for the key performance indicator which should be satisfied, or companies that handle the same item as an item transacted between the constituent company that does not meet the condition for the key performance indicator which should be satisfied and the transactional partner in the supply chain plan.

3. The supply chain management system according to claim 2, wherein
the processor is further configured to select the new transactional partner by taking evaluation or ownerships of the companies and as a narrowing-down condition.

4. A supply chain management method of a supply chain management apparatus that manages company activities from production to sales of products, the method performed by the supply chain management apparatus comprising the steps of:
receiving input information, from an external server device, indicating a change in market conditions as a trigger;
storing supply chain information in which constituent companies of a supply chain including at least two companies are registered, terms and conditions (T&Cs) information in which T&Cs of each of the constituent companies of the supply chain is registered, and a condition for a key performance indicator which should be satisfied, the condition for the key performance indicator being set for each of the constituent companies;

when the input information is received, calculating a supply chain plan corresponding to the change in the market conditions indicated by the input information based on a predetermined T&C calculation process, and when a key performance indicator calculated based on the supply chain plan does not meet the condition for the key performance indicator, dynamically changing at least one of the T&Cs that is related to lead time and that is permitted to be changed within a predetermined range of lead time previously set for the at least one of the T&Cs so that the key performance indicator is optimal for the condition for the key performance indicator, and calculating the supply chain plan using the changed T&Cs;

when the key performance indicator of one of the constituent companies that is calculated in the calculation step does not meet the condition for the key performance indicator which should be satisfied, execute a supply chain determination process to specify candidate companies by excluding companies that cannot satisfy the key performance indicator as bottlenecks and dynamically changing a transactional partner of the one constituent company to one of the candidate companies that do satisfy the key performance indicator, and updating the supply chain plan using the T&Cs of the changed constituent company;

outputting the calculated supply chain plan and the updated supply chain plan to a company terminal device of each the at least two companies via a communication unit;

calculating a cost based on a degree of improvement of the key performance indicator improved by a process performed by the calculating or the dynamically changing by the processor; and calculating, using the cost, a reward fee to be charged to the company.

5. A supply chain management apparatus comprising:

at least one storage device having a program stored thereon;

a processor which when executing the program configures the processor to:

receive input information, from an external server device, indicating a change in market conditions as a trigger;

store supply chain information in which constituent companies of a supply chain including at least two companies are registered, terms and conditions (T&Cs) information in which T&Cs of each of the constituent companies of the supply chain is registered, and a condition for a key performance indicator which should be satisfied, the condition for a key performance indicator being set for each of the constituent companies;

when the input information is received, calculate a supply chain plan corresponding to the change in the market conditions indicated by the input information based on a predetermined T&C calculation process, and when a key performance indicator calculated based on the supply chain plan does not meet the condition for the key performance indicator, dynamically change at least one the T&Cs that is related to lead time and that is permitted to be changed within a predetermined range of lead time previously set for the at least one of the T&Cs so that the key performance indicator is optimal for the condition for the key performance indicator, and calculate the supply chain plan using the changed T&Cs;

when the key performance indicator of one of the constituent companies that is calculated by the processor does not meet the condition for the key performance indicator which should be satisfied, execute a supply chain determination process to specify candidate companies by excluding companies that cannot satisfy the key performance indicator as bottlenecks and dynamically change a transactional partner of the one constituent company to one of the candidate companies that do satisfy the key performance indicator, and update the supply chain plan using the T&Cs of the changed constituent company;

output the calculated supply chain plan and the updated supply chain plan to a company terminal device of each the at least two companies via a communication unit;

calculate a cost based on a degree of improvement of the key performance indicator improved by a process performed by the calculating or the dynamically changing by the processor; and calculate, using the cost, a reward fee to be charged to the company.

* * * * *